United States Patent
Toda (10) Patent No.: US 6,674,806 B1
(45) Date of Patent: Jan. 6, 2004

(54) TRANSMITTING AND RECEIVING SYSTEM FOR DIGITAL COMMUNICATION ON ELECTRIC POWER-LINES

(76) Inventor: Kohji Toda, 1-49-18 Futaba, Yokosuka 239-0814 (JP)

(*) Notice: Subject to any disclaimer, the term of this patent is extended or adjusted under 35 U.S.C. 154(b) by 616 days.

(21) Appl. No.: 09/666,004

(22) Filed: Sep. 19, 2000

(51) Int. Cl.$^7$ .............................................. H04L 27/00
(52) U.S. Cl. ................................. 375/259; 340/310.01
(58) Field of Search ............................... 375/259, 257, 375/258; 340/310.01, 310.03, 310.06, 310.07

(56) References Cited

U.S. PATENT DOCUMENTS

| | | | |
|---|---|---|---|
| 5,710,488 A | * | 1/1998 | Nilssen ........................ 315/224 |
| 5,963,146 A | * | 10/1999 | Johnson et al. ......... 340/870.01 |
| 6,509,831 B1 | * | 1/2003 | Toda ...................... 340/310.01 |

* cited by examiner

Primary Examiner—Don N. Vo

(57) ABSTRACT

A transmitting and receiving system for digital communication on electric power-lines comprises a transmitting device and a receiving device. The transmitting device consists of an input terminal, a bipolar-pulse generator, a first piezoelectric substrate, first- and second coded IDTs, a first intermediary IDT, an electrode group, a synchronizing device, an envelope detecting device, a monopolar-pulse generator, and a mixer connected with electric power-lines. The receiving device consists of a receiving connector connected with the electric power-lines, a tuning coil, a second piezoelectric substrate, a second intermediary IDT, third- and fourth coded IDTs, a detecting device, and a detecting terminal. If a message digital-signal is applied to the bipolar-pulse generator via the input terminal, high-frequency bipolar-pulses (−1 and 1) are generated, and after all, are transduced to first- and second coded digital-signals at the monopolar-pulse generator. The first- and second coded digital-signals are delivered into the electric power-lines via the mixer. On the other hand, if the first coded digital-signal is received at the receiving connector, the first coded digital-signal is applied to the second intermediary IDT via the tuning coil. The first coded digital-signal is, after all, transduced to a first decoded pulse at the third coded IDT. In the same way, the second coded digital-signal is transduced to a second decoded pulse at the fourth coded IDT. As a result, an output digital-signal, which is composed of the first- and second decoded pulses and is equivalent to the message digital-signal, is detected at the detecting terminal via the detecting device.

12 Claims, 8 Drawing Sheets

TRANSMITTING AND RECEIVING SYSTEM FOR DIGITAL COMMUNICATION ON ELECTRIC POWER-LINES

BACKGROUND OF THE INVENTION

1. Field of the Invention

The present invention relates to a transmitting and receiving system for digital network communication on electric power-lines by means of using transmitting- and receiving devices, of which each includes a piezoelectric substrate and two coded interdigital transducers (IDTs).

2. Description of the Prior Art

Electric power-lines are greatly desired to be used for digital network communication. If a code division multiple access (CDMA) method avails for digital communication on electric power-lines, it is possible to make a transmission speed, in spread spectrum communication, high. In addition, if a surface acoustic wave (SAW) matched filter is incorporated in the CDMA method, it is possible to make the transmission speed still higher. However, it is difficult for a conventional type of CDMA method with the SAW matched filter to realize a base-band communication because of a coded message-signal under the condition of a phase shift keying (PSK) burst-signal. In other words, it is necessary to transduce the PSK burst-signal to a digital pulse signal with a high speed for the base-band communication. In order to make the digital pulse signal, the use of a complicated circuit is unavoidable for the conventional type of CDMA method with the SAW matched filter.

SUMMARY OF THE INVENTION

An object of the present invention is to provide a transmitting and receiving system for digital communication on electric power-lines comprising transmitting- and receiving devices.

Another object of the present invention is to provide the transmitting device capable of coding a message digital-signal applied thereto, and delivering the message digital-signal as a coded digital-signal into electric power-lines.

Another object of the present invention is to provide the receiving device capable of receiving the coded digital-signal from the electric power-lines, and detecting an output digital-signal corresponding to the message digital-signal.

Another object of the present invention is to provide a transmitting and receiving system for digital communication on electric power-lines capable of making the coded digital-signal, in the digital network, play a role as a pseudo-noise to keep a base-band communication secret.

Another object of the present invention is to provide a transmitting and receiving system for digital communication on electric power-lines capable of recognizing each other in the digital network.

Another object of the present invention is to provide a transmitting and receiving system for digital communication on electric power-lines capable of low electric power consumption.

Another object of the present invention is to provide a transmitting and receiving system for digital communication on electric power-lines excellent in durability and manufacturing.

A still other object of the present invention is to provide a transmitting and receiving system for digital communication on electric power-lines having a small size which is very light in weight and has a simple structure.

According to one aspect of the present invention there is provided a transmitting and receiving system for digital communication on electric power-lines comprising a transmitting device and a receiving device. The transmitting device consists of an input terminal, a bipolar-pulse generator, a first piezoelectric substrate, a first coded IDT, a second coded IDT, a first intermediary IDT, an electrode group, a synchronizing device, an envelope detecting device, a monopolar-pulse generator, and a mixer connected with electric power-lines. The electrode group consists of two sideward IDTs and a central IDT between the sideward IDTs. The synchronizing device is connected between the first intermediary IDT and one of the sideward IDTs. The envelope detecting device is connected with the central IDT. The receiving device consists of a receiving connector connected with the electric power-lines, a tuning coil, a second piezoelectric substrate, a second intermediary IDT, a third coded IDT, a fourth coded IDT, a detecting device, and a detecting terminal. The first-, second-, third-, and fourth coded IDTs, consisting of at least three interdigital electrode pairs, respectively, have first-, second-, third-, and fourth coded patterns, respectively.

If monopolar pulses of a message digital-signal are applied to the bipolar-pulse generator via the input terminal, the monopolar pulses are transduced to high-frequency bipolar-pulses (−1 and 1). When the high-frequency bipolar pulses (−1 and 1) are applied to the first- and second coded IDTs, respectively, first- and second surface acoustic waves (SAWs) corresponding to the first- and second coded patterns, respectively, are excited on the first piezoelectric substrate. The first- and second SAWs are detected at the first intermediary IDT as first- and second coded burst-signals, respectively. When the first coded burst-signal arrives at the sideward IDTs simultaneously, third- and fourth SAWs are excited on the first piezoelectric substrate 3. The third SAW takes a form of burst signal with the same phase state via the synchronizing device. The third- and fourth SAWs arrive at the central IDT simultaneously. And then, a first coded digital-signal is obtained at the monopolar-pulse generator via the envelope detecting device. In the same way, a second coded digital-signal is obtained at the monopolar-pulse generator. Thus, the first- and second coded digital-signals are delivered into the electric power-lines via the mixer.

On the other hand, if the first coded digital-signal is received at the receiving connector, the first coded digital-signal is applied to the second intermediary IDT via the tuning coil. In this time, a fifth SAW is excited on the second piezoelectric substrate. When the fifth SAW corresponds to the third coded pattern, a first decoded pulse is detected at the third coded IDT. In the same way, a second decoded pulse is detected at the fourth coded IDT. Thus, an output digital-signal, which is composed of the first- and second decoded pulses and is equivalent to the message digital-signal, is detected at the detecting terminal via the detecting device.

According to another aspect of the present invention there is provided a bipolar-pulse generator in place of the monopolar-pulse generator. The use of the bipolar-pulse generator enables a high-frequency transmission excellent in transmitting ability on the electric power-lines.

According to another aspect of the present invention there are provided first-, second-, third-, and fourth coded IDTs, having first-, second-, third-, and fourth coded patterns, respectively, which are changed in accordance with a designated time region, respectively.

According to another aspect of the present invention there is provided a transmitting device that the propagation direction of the first- and second SAWs is orthogonal to that of the third- and fourth SAWs.

According to another aspect of the present invention there is provided first- and second piezoelectric substrates, made of a piezoelectric ceramic plate, respectively, the polarization axis thereof being parallel to the thickness direction thereof.

According to another aspect of the present invention there is provided a subdevice, which is located between the tuning coil and the second intermediary IDT and consists of a third piezoelectric substrate, an input IDT, an output IDT located in parallel with the input IDT, an envelope detecting device, and a bipolar-pulse generator.

In the subdevice incorporated into the receiving device, when the first coded digital-signal is applied to the input IDT via the tuning coil, a SAW is excited on the third piezoelectric substrate. The SAW is detected at the output IDT as a first coded row of bursts. And then, a first coded row of digital-pulses is caused at the envelope detecting device. The first coded row of digital-pulses is transduced to a first coded row of high-frequency bipolar-pulses at the bipolar-pulse generator. Thus, the first coded row of high-frequency bipolar-pulses is applied to the second intermediary IDT. In the same way, a second coded row of high-frequency bipolar-pulses is applied to the second intermediary IDT.

According to other aspect of the present invention there are provided transmitting and receiving devices. The transmitting device consists of an input terminal, a first bipolar-pulse generator, a first piezoelectric substrate, first- and second coded IDTs, a first electrode-group, an envelope detecting device connected with the first electrode-group, a monopolar-pulse generator, and a mixer connected with electric power-lines. The receiving device consists of a receiving connector connected with the electric power-lines, a tuning coil, a second piezoelectric substrate, a second electrode-group, a second bipolar-pulse generator, an intermediary IDT, third- and fourth coded IDTs, a detecting device, and a detecting terminal. The first-, second-, third-, and fourth coded IDTs consist of at least three interdigital electrode pairs Pi (i=1, 2, ..., n), respectively, of which two neighbors are at a distance L from each other. The first-, second-, third-, and fourth coded IDTs have first-, second-, third-, and fourth coded patterns, respectively. The third- and fourth coded patterns are in reverse to the first- and second coded patterns, respectively. The first electrode-group consists of an interdigital electrode $A_0$ and an interdigital electrode $A_i$ (i=1) at a distance iL (i=1) from the interdigital electrode $A_0$. The second electrode-group consists of a central interdigital electrode $B_0$, a left interdigital electrode $B_{-1}$ at a distance $L_0$ from the central interdigital electrode $B_0$, and an interdigital electrode $B_i$ (i=1) at a distance $L_0$+iL (i=1) from the central interdigital electrode $B_0$.

When the high-frequency bipolar pulses (−1 and 1) are applied to the first- and second coded IDTs, respectively, first- and second SAWs are excited on the first piezoelectric substrate, respectively. The first SAW is detected as a first coded burst-signal at interdigital electrode $A_0$, and after a time corresponding to the distance L, at interdigital electrode $A_1$ again. As a result, the monopolar-pulse generator causes, via the envelope detecting device, a first double-coded digital-signal. In the same way, a second double-coded digital-signal is generated at the monopolar-pulse generator. Thus, the first- and second double-coded digital-signals are delivered into the electric power-lines via the mixer.

On the other hand, if the first double-coded digital-signal is applied to the left interdigital electrode $B_{-1}$ and right interdigital electrode $B_1$ via the tuning coil, third- and fourth SAWs are excited on the second piezoelectric substrate. The third SAW arrives at the central interdigital electrode $B_0$ by a time corresponding to the distance L before the fourth SAW arrives at central interdigital electrode $B_0$. As a result, the first double-coded digital-signal is transduced to a first monocoded burst-signal at central interdigital electrode $B_0$. The first monocoded burst-signal is transduced to a first monocoded digital-signal at the bipolar-pulse generator. When the first monocoded digital-signal is applied to the second intermediary IDT, a fifth SAW is excited on the second piezoelectric substrate When the fifth SAW corresponds to the third coded pattern, a first decoded pulse is detected at the third coded IDT. In the same way, a second decoded pulse is detected at the fourth coded IDT. As a result, an output digital-signal, which is composed of the first- and second decoded pulses and is equivalent to the message digital-signal, is detected at the detecting terminal via the detecting device. The use of the first- and second electrode-groups enable a double-coding and double-decoding system.

According to a further aspect of the present invention there are provided first- and second electrode-groups. The first electrode-group includes at least two interdigital electrodes $A_i$ {i=1, 2, ..., (n−1)} at a distance iL {i=1, 2, ..., (n−1)}, respectively, from the interdigital electrode $A_0$. The second electrode-group includes at least two right interdigital electrodes $B_i$ {i=1, 2, ..., (n−1)} at a distance $L_0$+iL {i=1, 2, ..., (n−1)}, respectively, from the central interdigital electrode $B_0$. When the interdigital electrodes $A_i$ take turns in connecting with the envelope detecting device, the interdigital electrodes $B_i$ take turns in connecting with the receiving connector. The use of the first- and second electrode-groups enable a complicated double-coding and double-decoding system.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
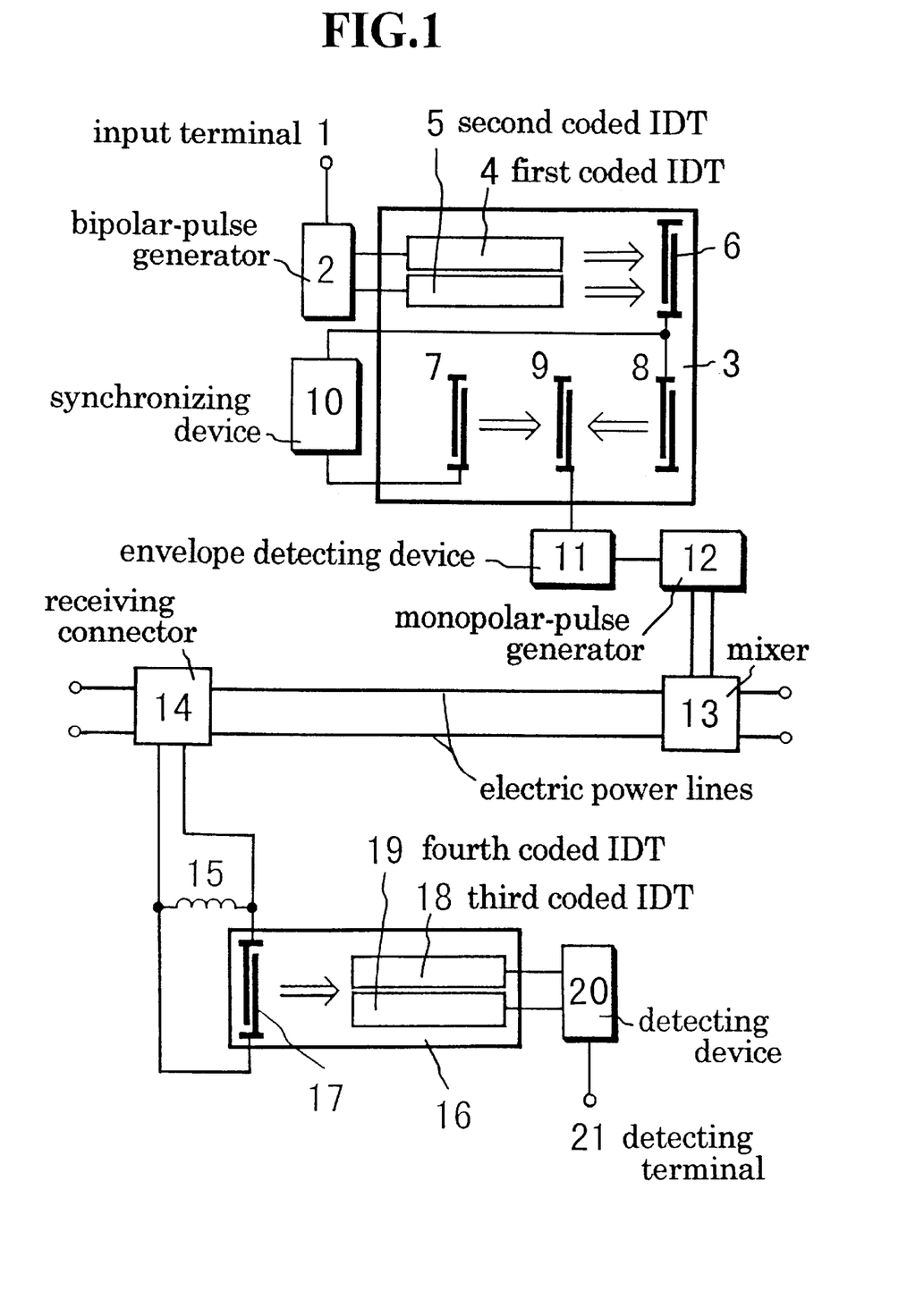
FIG. 1 shows a schematic illustration of a transmitting and receiving system for digital communication on electric power-lines, according to an embodiment of the present invention.

FIG. 1 shows a schematic illustration of a transmitting and receiving system for digital communication on electric power-lines according to an embodiment of the present invention. The transmitting and receiving system for digital communication on electric power-lines comprises transmitting- and receiving devices. The transmitting device comprises input terminal 1, bipolar-pulse generator 2, first piezoelectric substrate 3, first coded IDT 4, second coded IDT 5, first intermediary IDT 6, sideward IDT 7, sideward IDT 8, central IDT 9, synchronizing device 10, envelope detecting device 11, monopolar-pulse generator 12, and mixer 13 connected with electric power-lines. Sideward IDT 7, sideward IDT 8, and central IDT 9 form an electrode group. Synchronizing device 10 is connected between first intermediary IDT 6 and sideward IDT 7. Envelope detecting device 11 is connected with central IDT 9. The receiving device comprises receiving connector 14 connected with the electric power-lines, tuning coil 15, second piezoelectric substrate 16, second intermediary IDT 17, third coded IDT 18, fourth coded IDT 19, detecting device 20, and detecting terminal 21. First piezoelectric substrate 3 and second piezoelectric substrate 16 are made of a piezoelectric ceramic thin plate with a dimension of 200 $\mu$m in thickness, respectively, and the polarization axis thereof is parallel to the thickness direction thereof. First coded IDT 4, second coded IDT 5, first intermediary IDT 6, sideward IDT 7, sideward IDT 8, and central IDT 9, made of an aluminum thin film, respectively, are formed on first piezoelectric substrate 3. Second intermediary IDT 17, third coded IDT 18, and fourth coded IDT 19, made of an aluminum thin film, respectively, are formed on second piezoelectric substrate 16. First intermediary IDT 6, sideward IDT 7, sideward IDT 8, central IDT 9, and second intermediary IDT 17 have an interdigital periodicity of 40 $\mu$m, respectively. Thus, both the transmitting- and receiving devices have a simple structure with s small size.

Figure 2:
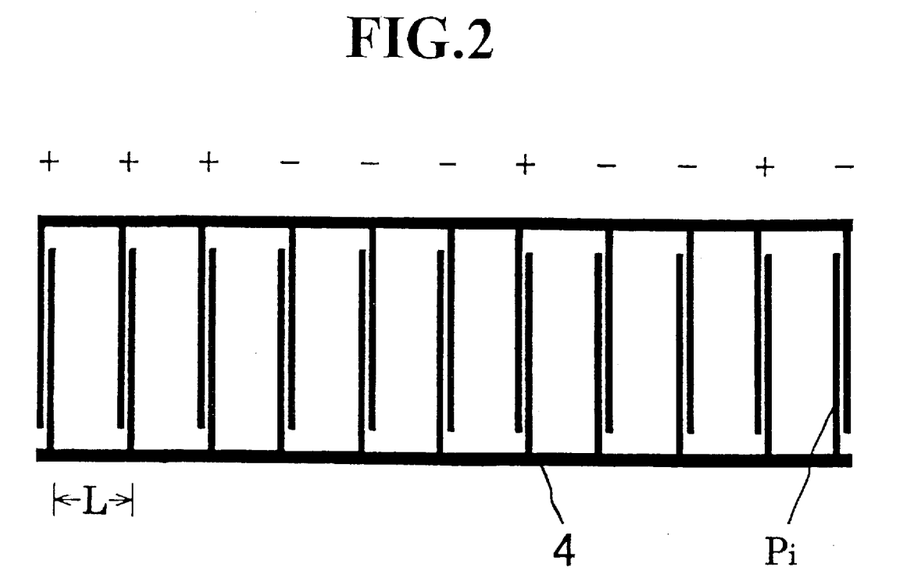
FIG. 2 shows a plan view of first coded IDT 4, which consists of eleven interdigital electrode pairs.

FIG. 2 shows a plan view of first coded IDT 4, which consists of eleven interdigital electrode pairs. Each pair has an interdigital periodicity of 40 $\mu$m. First coded IDT 4 has a first coded pattern based on the Baker code. Second coded IDT 5 also consists of eleven interdigital electrode pairs, and has a second coded pattern. Third coded IDT 18 has a third coded pattern in reverse to the first coded pattern. Fourth coded IDT 19 has a fourth coded pattern in reverse to the second coded pattern. Besides an eleven-digits code (1, 1, 1, 0, 0, 0, 1, 0, 0, 1, 0) as shown in FIG. 2, for example, a three-digits code (1, 1, 0), a seven-digits code (1, 1, 1, 0, 0, 1, 0), and others are available.

In the transmitting and receiving system for digital communication on electric power-lines in FIG. 1, if monopolar pulses of a message digital-signal are applied to bipolar-pulse generator 2 via input terminal 1, the monopolar pulses are transduced to high-frequency bipolar-pulses (−1 and 1). When the high-frequency bipolar pulses (−1 and 1) are applied to first coded IDT 4 and second coded IDT 5, respectively, first- and second SAWs corresponding to the first- and second coded patterns, respectively, are excited on first piezoelectric substrate 3. The first- and second SAWs are detected at first intermediary IDT 6 as first- and second coded burst-signals, respectively. When the first coded burst-signal arrives at sideward IDT 7 and sideward IDT 8, third- and fourth SAWs are excited on first piezoelectric substrate 3. The third SAW takes a form of burst signal with the same phase state via synchronizing device 10. The third- and fourth SAWs arrive at central IDT 9 simultaneously. And then, a first coded digital-signal, that is, a first coded row of eleven monopolar digital-pulses, is obtained at monopolar-pulse generator 12 via envelope detecting device 11. In the same way, when the second coded burst-signal arrives at sideward IDT 7 and sideward IDT 8, third- and fourth SAWs are excited on first piezoelectric substrate 3. The third- and fourth SAWs arrive at central IDT 9 simultaneously. And then, a second coded digital-signal is obtained at monopolar-pulse generator 12 via envelope detecting device 11. Thus, the first- and second coded digital-signals are delivered into the electric power-lines via mixer 13.

On the other hand, if the first coded digital-signal is received at receiving connector 14, the first coded digital-signal is applied to second intermediary IDT 17 via tuning coil 15. In this time, a fifth SAW composed of a first coded row of eleven burst-waves is excited on second piezoelectric substrate 16. When the first coded row of eleven burst-waves corresponds to the third coded pattern, a first decoded pulse is detected at third coded IDT 18. In the same way, if the second coded digital-signal is received at receiving connector 14, the second coded digital-signal is applied to second intermediary IDT 17 via tuning coil 15. And then, the fifth SAW composed of a second coded row of eleven burst-waves is excited on second piezoelectric substrate 16. When the second coded row of eleven burst-waves corresponds to the fourth coded pattern, a second decoded pulse is detected at fourth coded IDT 19. Thus, both third coded IDT 18 and fourth coded IDT 19 have an ability as a SAW matched filter. As a result, an output digital-signal, which is composed of the first- and second decoded pulses and is equivalent to the message digital-signal, is detected at detecting terminal 21 via detecting device 20 without the influence of noises. In addition, because of a coding function of the transmitting device and a decoding function of the receiving device, it is possible to make the first- and second coded digital-signals, on the electric power-lines, play a role as a pseudo-noise to keep a base-band communication secret. Moreover, it is possible for the transmitting device and the receiving device to recognize each other in the digital network. The incorporation of the SAW devices in the present digital communication system is characterized as follows: (a) real time synchronization, (b) simple system construction.

Figure 3:
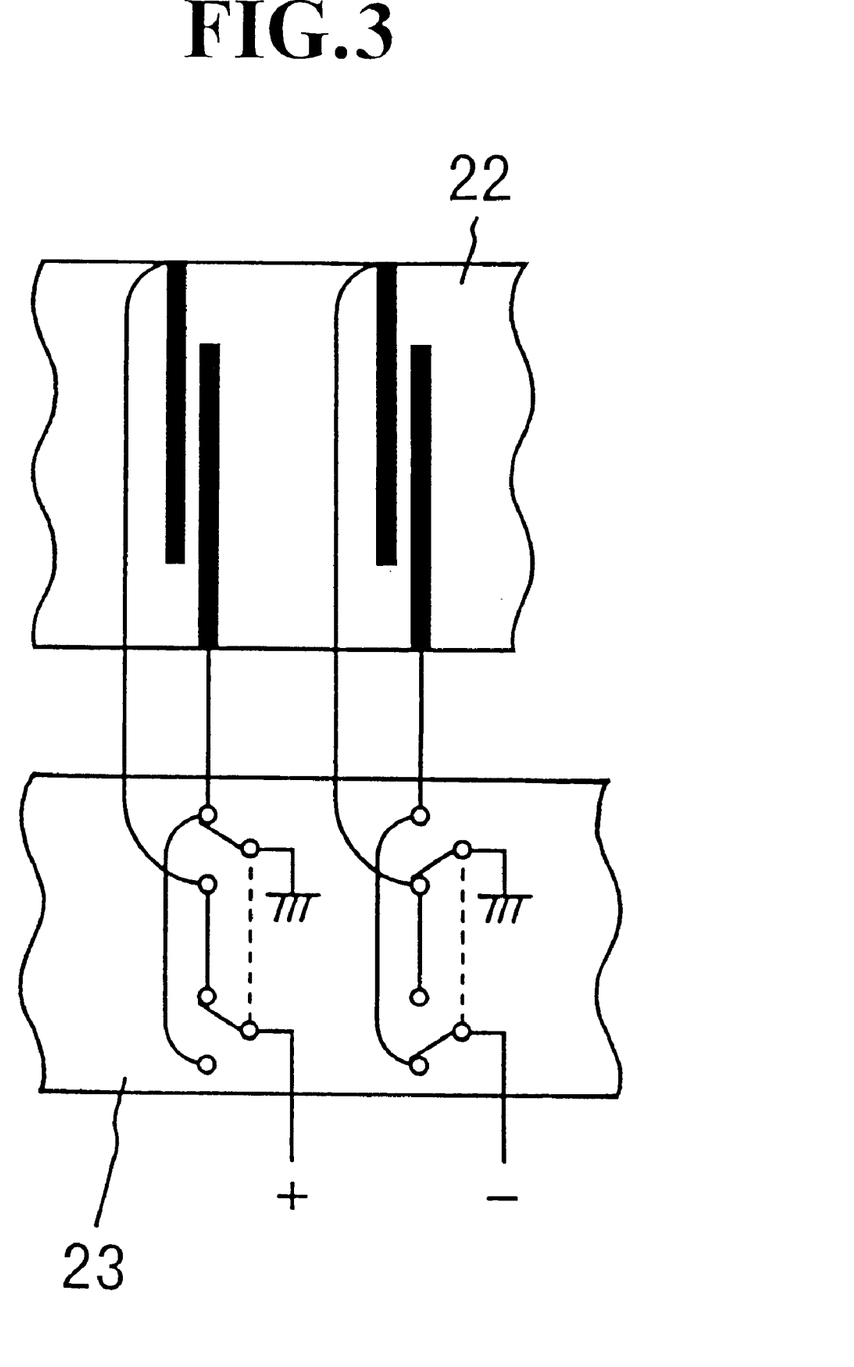
FIG. 3 shows a fragmentary plan view of another coded IDT 22 which is used in place of first coded IDT 4, second coded IDT 5, third coded IDT 18, and fourth coded IDT 19, respectively.

FIG. 3 shows a fragmentary plan view of another coded IDT 22 which is used in place of first coded IDT 4, second coded IDT 5, third coded IDT 18, and fourth coded IDT 19, respectively. Coded IDT 22 consists of eleven interdigital electrode pairs. Each pair has an interdigital periodicity of 40 $\mu$m. Coded IDT 22 has a coded pattern, which is changed in accordance with a designated time region by using switch 23. Thus, coded IDT 22 that incorporates switch 23 realizes the same function as first coded IDT 4, second coded IDT 5, third coded IDT 18, and fourth coded IDT 19.

In the transmitting and receiving system for digital communication on electric power-lines in FIG. 1, the propagation direction of the first- and second SAWs are parallel to that of the third- and fourth SAWs. However, it is possible to arrange sideward IDT 7, sideward IDT 8, and central IDT 9 in order that the propagation direction of the first- and second SAWs are orthogonal to that of the third- and fourth SAWs.

Figure 4:
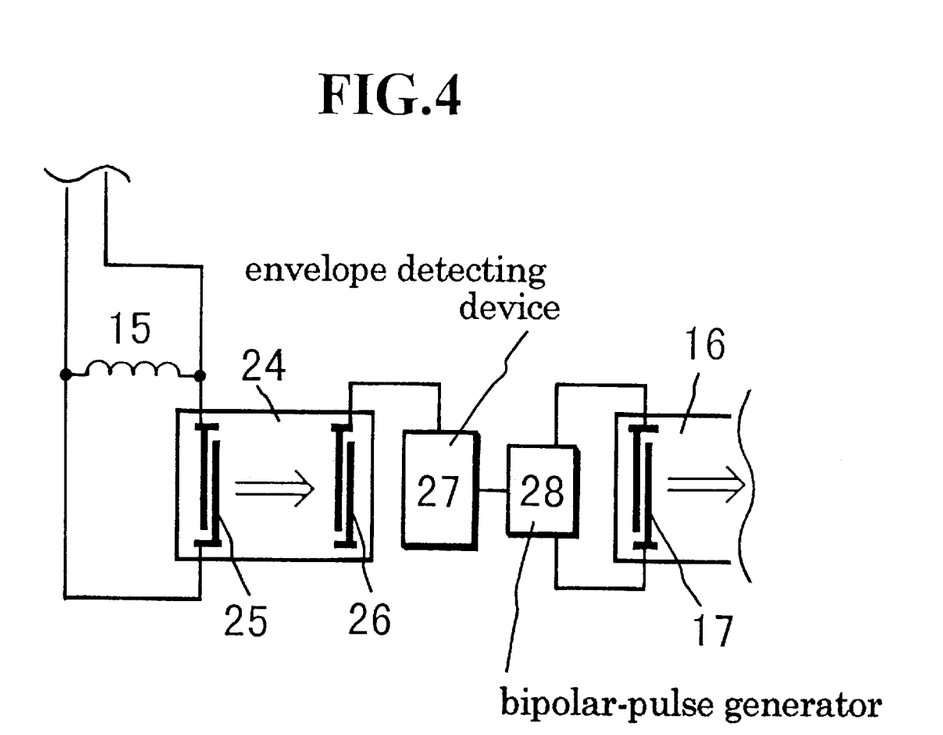
FIG. 4 shows a schematic illustration of a subdevice incorporated into the receiving device.

FIG. 4 shows a schematic illustration of a subdevice incorporated into the receiving device. The subdevice is located between tuning coil 15 and second intermediary IDT 17, and comprises third piezoelectric substrate 24, input IDT 25, output IDT 26, envelope detecting device 27, and bipolar-pulse generator 28. Output IDT 26 is located in parallel with input IDT 25.

In the subdevice incorporated into the receiving device in FIG. 1, if the first coded digital-signal is received at receiving connector 14, the first coded digital-signal arrives at input IDT 25 via tuning coil 15. As the first coded digital-signal is composed of the first coded row of eleven monopolar digital-pulses, a SAW composed of a first coded row of eleven burst-waves is excited on third piezoelectric substrate 24. The SAW is detected at output IDT 26 as a first coded row of eleven bursts. And then, a first coded row of digital-pulses is caused at envelope detecting device 27. The first coded row of digital-pulses is transduced to a first coded row of high-frequency bipolar-pulses at bipolar-pulse generator 28. Thus, the first coded row of high-frequency bipolar-pulses is applied to second intermediary IDT 17. Therefore, the fifth SAW composed of a first coded row of eleven high-frequency burst-waves is excited on second piezoelectric substrate 16. In the same way, if the second coded digital-signal is received at receiving connector 14, the second coded digital-signal arrives at input IDT 25 via tuning coil 15. The second coded digital-signal is, last of all, transduced to a second coded row of high-frequency bipolar-pulses at bipolar-pulse generator 28. Thus, the second coded row of high-frequency bipolar-pulses is applied to second intermediary IDT 17. Therefore, the fifth SAW composed of a second coded row of eleven high-frequency burst-waves is excited on second piezoelectric substrate 16. It is possible for the subdevice to prevent the influence of noises before the first- and second coded digital-signal arrive at second intermediary IDT 17.

In the transmitting device included in the transmitting and receiving system for digital communication on electric power-lines in FIG. 1, the first- and second coded digital-signals, that is, the first- and second coded rows of eleven monopolar digital-pulses, respectively are generated at monopolar-pulse generator 12. Thus, a monopolar-type transmission on the electric power-lines is realized. However a bipolar-type transmission is superior in transmission ability to the monopolar-type transmission. If using bipolar-pulse generator 29 in place of monopolar-pulse generator 12, the first- and second coded digital-signals composed of the first- and second coded rows of eleven high-frequency bipolar-pulses, respectively, are generated at bipolar-pulse generator 29. The use of bipolar-pulse generator 29 enables a high-frequency transmission excellent in transmitting ability on electric power-lines.

Figure 5:
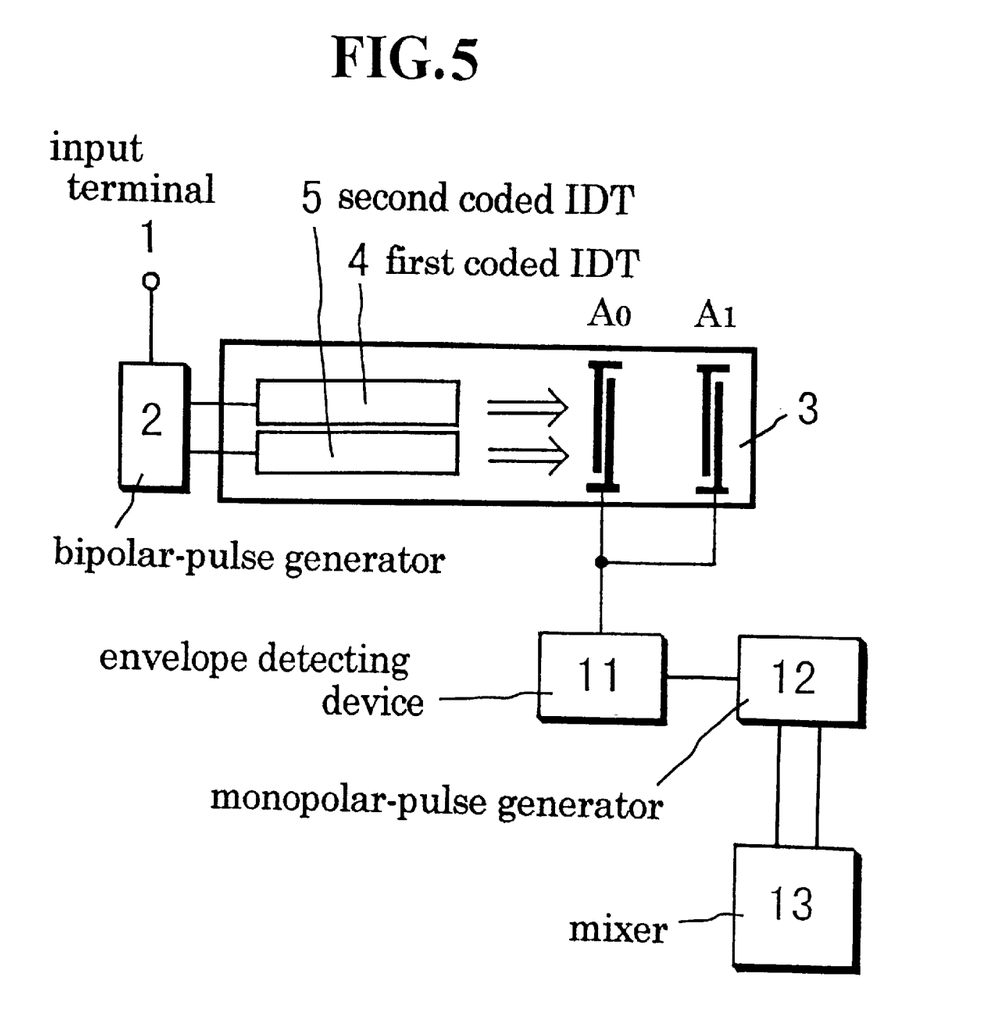
FIG. 5 shows a schematic illustration of another transmitting device in place of the transmitting device in FIG. 1.
Figure 6:
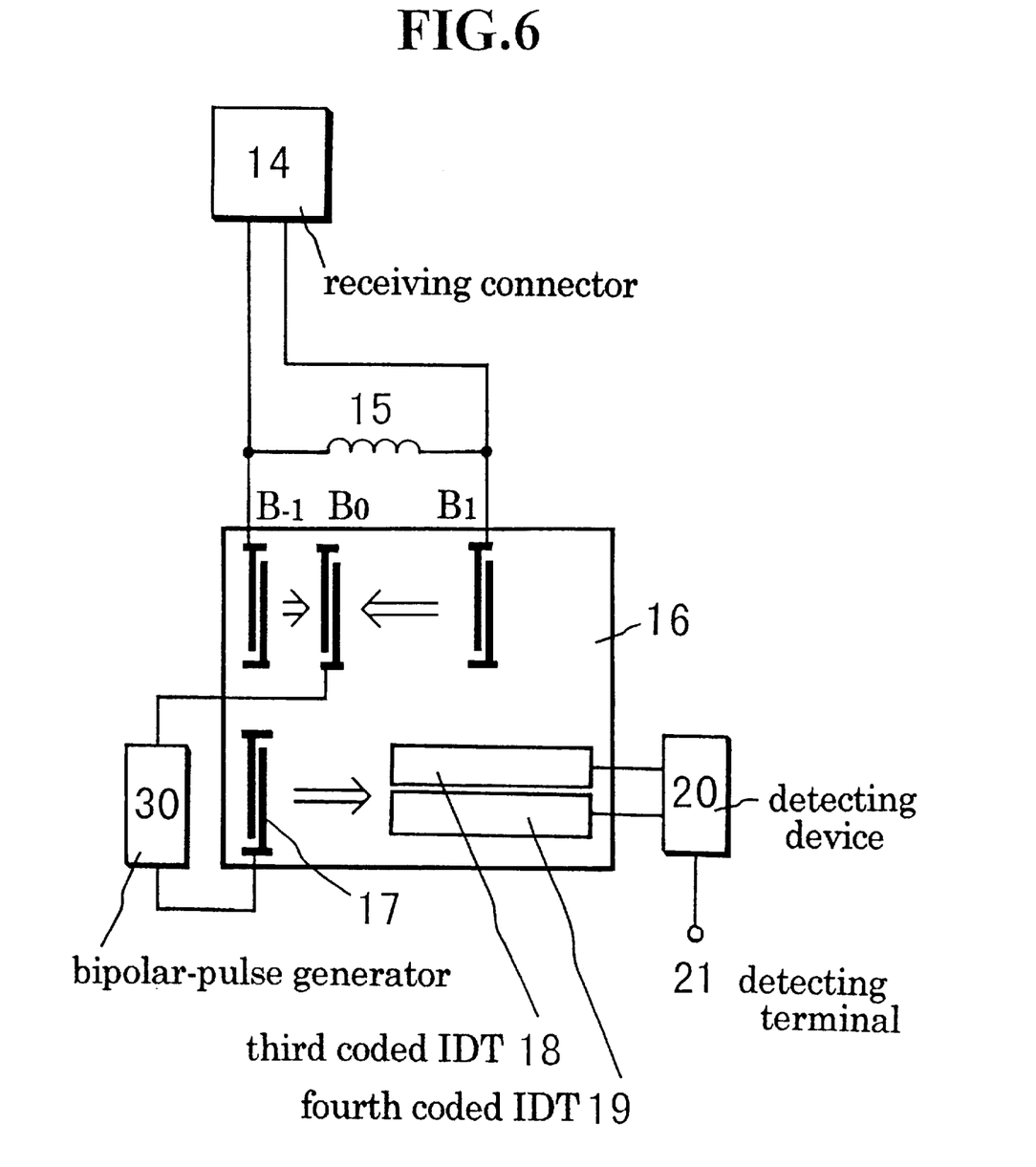
FIG. 6 shows a schematic illustration of the receiving device in place of the receiving device in FIG. 1.

FIG. 5 shows a schematic illustration of another transmitting device in place of the transmitting device in FIG. 1. However, when using the transmitting device in FIG. 5, another receiving device in FIG. 6 is necessary. The transmitting device in FIG. 5 comprises input terminal 1, bipolar-pulse generator 2, first piezoelectric substrate 3, first coded IDT 4, second coded IDT 5, a first electrode-group consisting of interdigital electrodes $A_0$ and $A_1$, envelope detecting device 11, monopolar-pulse generator 12, and mixer 13. The first electrode-group made of an aluminum thin film is formed on first piezoelectric substrate 3, and has an interdigital periodicity of 40 μm.

FIG. 6 shows a schematic illustration of the receiving device in place of the receiving device in FIG. 1. The receiving device in FIG. 6 comprises receiving connector 14, tuning coil 15, second piezoelectric substrate 16, a second electrode-group consisting of central interdigital electrode $B_0$, left interdigital electrode $B_{-1}$, and right interdigital electrode $B_1$, bipolar-pulse generator 30, second intermediary IDT 17, third coded IDT 18, fourth coded IDT 19, detecting device 20, and detecting terminal 21. The second electrode-group made of an aluminum thin film is formed on second piezoelectric substrate 16, and has an interdigital periodicity of 40 μm. Left interdigital electrode $B_{-1}$ is at a distance $L_0$ from central interdigital electrode $B_0$. Right interdigital electrode $B_1$ is at a distance $L_0+L$ from central interdigital electrode $B_0$.

In a transmitting and receiving system for digital communication on electric power-lines composed of the transmitting device in FIG. 5 and the receiving device in FIG. 6, if monopolar pulses of a message digital-signal are applied to bipolar-pulse generator 2 via input terminal 1, the monopolar pulses are transduced to high-frequency bipolar-pulses (−1 and 1). When the high-frequency bipolar pulses (−1 and 1) are applied to first coded IDT 4 and second coded IDT 5, respectively, first- and second SAWs are excited on first piezoelectric substrate 3, respectively. The first SAW is detected as a first coded burst-signal at interdigital electrode $A_0$, and after a time corresponding to the distance L, at interdigital electrode $A_1$ again. The use of monopolar-pulse generator 12 causes, via envelope detecting device 11, a first double-coded digital-signal, that is, a first double-coded row of monopolar digital-pulses, of which each is made from one burst at interdigital electrode $A_0$ and the previous burst at interdigital electrode $A_1$. For example, a third monopolar digital-pulse is made from a third burst at interdigital electrode $A_0$ and a second burst at interdigital electrode $A_1$. Thus, the first double-coded digital-signal, including twelve monopolar digital-pulses in all, is delivered into the electric power-lines via mixer 13. In the same way, the second SAW is detected as a second coded burst-signal at interdigital electrode $A_0$, and after a time corresponding to the distance L, at interdigital electrode $A_1$ again. The use of monopolar-pulse generator 12 causes, via envelope detecting device 11, a second double-coded digital-signal, that is, a second double-coded row of monopolar digital-pulses, of which each is made from one burst at interdigital electrode $A_0$ and the previous burst at interdigital electrode $A_1$. Thus, the first- and second double-coded digital-signals are delivered into the electric power-lines via mixer 13.

On the other hand, if the first double-coded digital-signal is received at receiving connector 14, the first double-coded digital-signal is applied to left interdigital electrode $B_{-1}$ and right interdigital electrode $B_1$ via tuning coil 15. In this time, third- and fourth SAWs are excited on second piezoelectric substrate 16. The third SAW arrives at central interdigital electrode $B_0$ by a time corresponding to the distance L before the fourth SAW arrives at central interdigital electrode $B_0$. Because both the third- and fourth SAWs are composed of a row of twelve burst waves corresponding to the twelve monopolar digital pulses of the first double-coded row, one burst wave of the third SAW and the previous burst wave of the fourth SAW consequently arrive at central interdigital electrode $B_0$ simultaneously. Thus, a first step of a signal decoding is achieved. As a result, the first double-coded digital-signal is transduced to a first monocoded burst-signal at central interdigital electrode $B_0$. The first monocoded burst-signal is transduced to a first monocoded digital-signal, that is, a first monocoded row of high-frequency bipolar-pulses, at bipolar-pulse generator 30. The first monocoded digital-signal is applied to second intermediary IDT 17. And then, a fifth SAW composed of a first coded row of eleven burst-waves is excited on second piezoelectric substrate 16. When the first coded row of eleven burst-waves corresponds to the third coded pattern, a first decoded pulse is detected at third coded IDT 18. Thus, a second step of the signal decoding is achieved. In other words, the first monocoded digital-signal is transduced to the first decoded pulse at third coded IDT 18. In the same way, if the second double-coded digital-signal is received at receiving connector 14, the second double-coded digital-signal is applied to left interdigital electrode $B_{-1}$ and at right interdigital electrode $B_1$ via tuning coil 15. In this time, third- and fourth SAWs are excited on second piezoelectric substrate 16. The third SAW arrives at central interdigital electrode $B_0$ by a time corresponding to the distance L before the fourth SAW arrives at central interdigital electrode $B_0$. As a result, the second double-coded digital-signal is transduced to a second monocoded burst-signal at central interdigital electrode $B_0$. The second monocoded burst-signal is transduced to a second monocoded digital-signal, that is, a second monocoded row of high-frequency bipolar-pulses, at bipolar-pulse generator 30. When the second monocoded digital-signal is applied to second intermediary IDT 17, the fifth SAW composed of a second coded row of eleven burst-waves is excited on second piezoelectric substrate 16. When the second coded row of eleven burst-waves corresponds to the fourth coded pattern, a second decoded pulse is detected at fourth coded IDT 19. Thus, the second monocoded digital-signal is transduced to the second decoded pulse at fourth coded IDT 19. As a result, an output digital-signal, which is composed of the first- and second decoded pulses and is equivalent to the message digital-signal, is detected at detecting terminal 21 via detecting device 20 without the influence of noises.

In the receiving device in FIG. 6, the propagation direction of the third- and fourth SAWs is parallel to that of the fifth SAW. However, it is possible to arrange intermediary IDT 17, third coded IDT 18, and fourth coded TDT 19 in order that the propagation direction of the third- and fourth SAWs is orthogonal to that of the fifth SAW.

Figure 7:
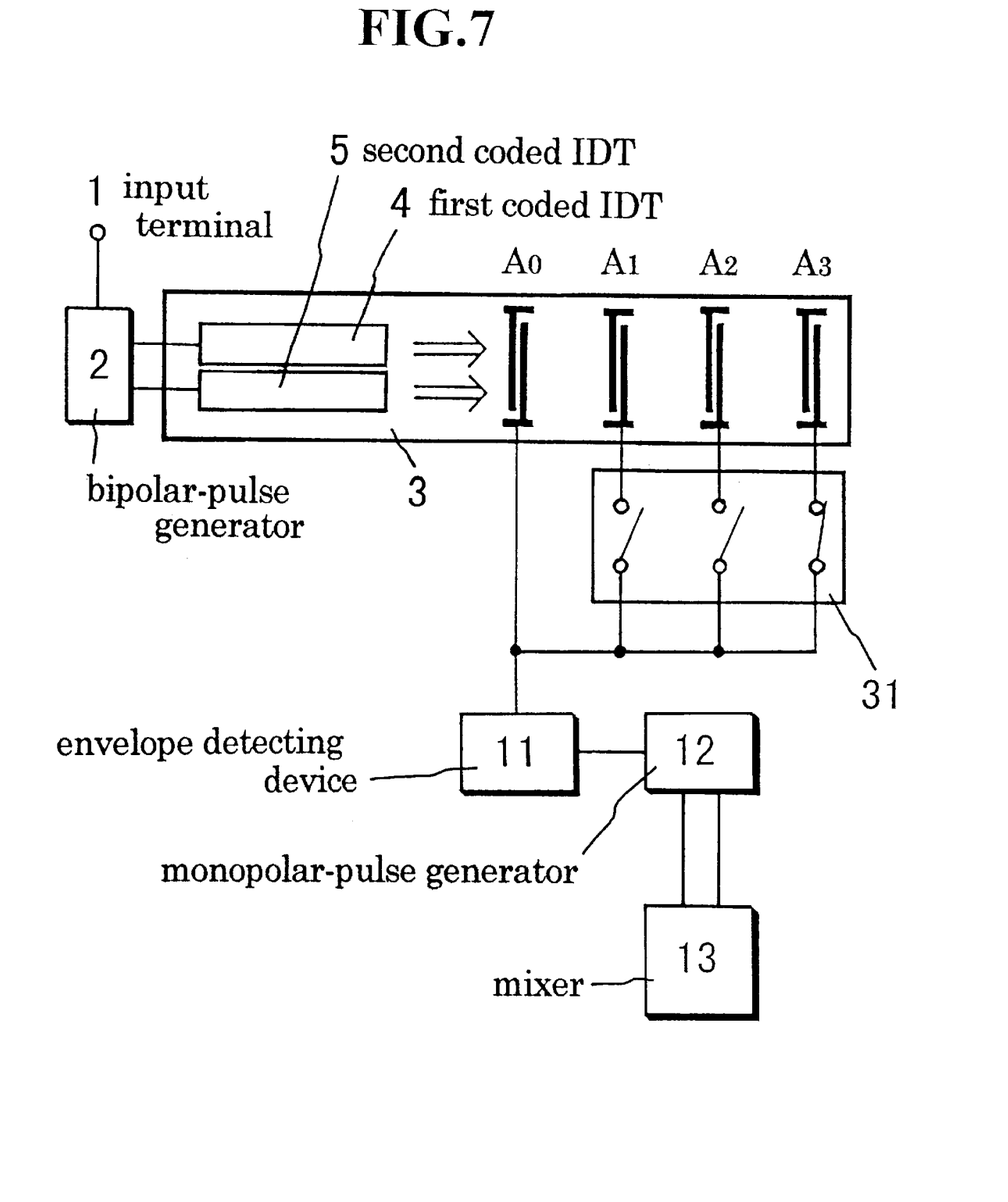
FIG. 7 shows a schematic illustration of a still other transmitting device in place of the transmitting device in FIG. 1.

FIG. 7 shows a schematic illustration of a still other transmitting device in place of the transmitting device in FIG. 1. The transmitting device in FIG. 7 has the same construction as FIG. 5, except for further comprising switch 31, and interdigital electrodes $A_2$ and $A_3$, which are included in the first electrode-group. A distance between interdigital electrodes $A_1$ and $A_2$, and that between interdigital electrodes $A_2$ and $A_3$, in FIG. 7, are the same as the distance L. Interdigital electrodes $A_2$ and $A_3$ have an interdigital periodicity of 40 $\mu$m, respectively. When using the transmitting device in FIG. 7, a still other receiving device in FIG. 8 is necessary.

Figure 8:
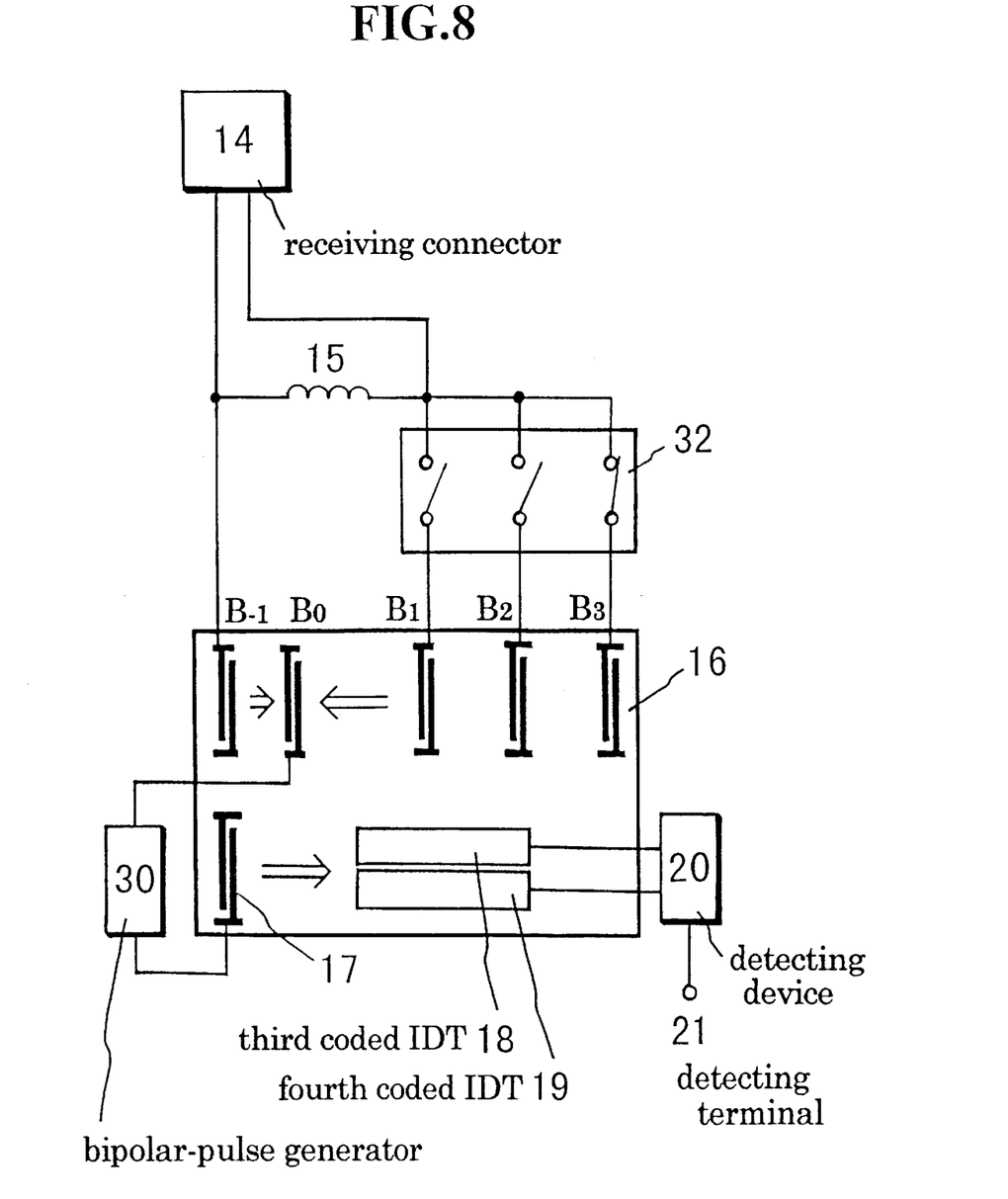
FIG. 8 shows a schematic illustration of the receiving device in place of the receiving device in FIG. 1.

FIG. 8 shows a schematic illustration of the receiving device in place of the receiving device in FIG. 1. The receiving device in FIG. 8 has the same construction as FIG. 6, except for further comprising switch 32, and right interdigital electrodes $B_2$ and $B_3$, which are included in the second electrode-group. A distance between right interdigital electrodes $B_1$ and $B_2$, and that between right interdigital electrodes $B_2$ and $B_3$, in FIG. 8, are the same as the distance L. Thus, a distance between central interdigital electrodes $B_0$ and right interdigital electrode $B_2$ is $L_0+2L$, and that between central interdigital electrodes $B_0$ and right interdigital electrode $B_3$ is $L_0+3L$. Right interdigital electrodes $B_2$ and $B_3$ have an interdigital periodicity of 40 $\mu$m, respectively.

In a transmitting and receiving system for digital communication on electric power-lines composed of the transmitting device in FIG. 7 and the receiving device in FIG. 8, if a message digital-signal is applied to bipolar-pulse generator 2 via input terminal 1, high-frequency bipolar-pulses (−1 and 1) are generated. When the high-frequency bipolar pulses (−1 and 1) are applied to first coded IDT 4 and second coded IDT 5, respectively, first- and second SAWs are excited on first piezoelectric substrate 3, respectively. The first SAW is detected as a first coded burst-signal, that is, a first coded row of eleven bursts, at interdigital electrode $A_0$, and after a time corresponding to the distances L, 2L and 3L, at interdigital electrodes $A_1$, $A_2$, and $A_3$, respectively. The use of switch 31 carries out that the first coded burst-signal at one of interdigital electrodes $A_1$, $A_2$, and $A_3$, arrives at envelope detecting device 11. Thus, monopolar-pulse generator 12 causes a first double-coded digital-signal, that is, a first double-coded row of monopolar digital-pulses, of which each is made from an (n)th burst at interdigital electrode $A_0$, and an (n−1)th burst at interdigital electrode $A_1$, or an (n−2)th burst at interdigital electrode $A_2$, or an (n−3)th burst at interdigital electrode $A_3$. For example, a sixth monopolar digital-pulse is made from a sixth burst at interdigital electrode $A_0$ and a third burst at interdigital electrode $A_3$. Thus, the first double-coded digital-signal, including twelve, thirteen or fourteen monopolar digital-pulses, is delivered into the electric power-lines via mixer 13. In the same way, the second SAW arrives as a second coded burst-signal, that is, a second coded row of eleven bursts, at interdigital electrode $A_0$, and after a time corresponding to the distances L, 2L and 3L, at interdigital electrodes $A_1$, $A_2$, and $A_3$, respectively. After all, a second double-coded digital-signal generated at monopolar-pulse generator 12 is delivered into the electric power-lines via mixer 13.

On the other hand, if the first double-coded digital-signal is received at receiving connector 14, the first double-coded digital-signal is applied, via tuning coil 15, to left interdigital electrode $B_{-1}$, and one, which is connected to receiving connector 14 by switch 32, of right interdigital electrodes $B_1$, $B_2$ and $B_3$. Thus, a third SAW is excited at left interdigital electrode $B_{-1}$, and a fourth SAW is excited at one of right interdigital electrodes $B_1$, $B_2$ and $B_3$, on second piezoelectric substrate 16. Central interdigital electrode $B_0$ receives the third SAW, and after a time corresponding to the distance L, 2L or 3L the fourth SAW. Both the third- and fourth SAWs are composed of a row of twelve, thirteen or fourteen burst waves corresponding to the monopolar digital-pulses of the first double-coded row. Therefore, at the same time that an (n)th burst wave of the third SAW arrives at central interdigital electrode $B_0$, an (n−1)th burst wave of the fourth SAW at right interdigital electrodes $B_1$, or an (n−2)th burst wave of the fourth SAW at right interdigital electrodes $B_2$, or an (n−3)th burst wave of the fourth SAW at right interdigital electrodes $B_3$ consequently arrives at central interdigital electrode $B_0$. For example, a fourth burst wave of the third SAW and a second burst wave of the fourth SAW at right interdigital electrodes $B_2$ arrive at central interdigital electrode $B_0$ simultaneously. Thus, a first step of a signal decoding is achieved. As a result, the first double-coded digital-signal is transduced to a first monocoded burst-signal at central interdigital electrode $B_0$. The first monocoded burst-signal is transduced to a first monocoded digital-signal, that is, a first monocoded row of high-frequency bipolar-pulses, at bipolar-pulse generator 30. The first monocoded digital-signal is applied to second intermediary IDT 17. And then, a fifth SAW is excited on second piezoelectric substrate 16. When the fifth SAW corresponds to the third coded pattern, a first decoded pulse is detected at third coded IDT 18. Thus, a second step of the signal decoding is achieved. In other words, the first monocoded digital-signal is transduced to the first decoded pulse at third coded IDT 18. In the same way, if the second double-coded digital-signal is received at receiving connector 14, the second double-coded digital-signal is applied, via tuning coil 15, to left interdigital electrode $B_{-1}$, and one, which is connected to receiving connector 14 by switch 32, of right interdigital electrodes $B_1$, $B_2$ and $B_3$. Thus, a third SAW is excited at left interdigital electrode $B_{-1}$, and a fourth SAW is excited at one of right interdigital electrodes $B_1$, $B_2$ and $B_3$, on second piezoelectric substrate 16. Central interdigital electrode $B_0$ receives the third SAW, and after a time corresponding to the distance L, 2L or 3L the fourth SAW. As a result, the second double-coded digital-signal is transduced to a second monocoded burst-signal at central interdigital electrode $B_0$. The second monocoded burst-signal is transduced to a second monocoded digital-signal at bipolar-pulse generator 30. The second digital-signal is applied to intermediary IDT 17, and then, a fifth SAW is excited on second piezoelectric substrate 16. In this time, if the fifth SAW corresponds to the fourth coded pattern, a second decoded pulse is detected at fourth coded IDT 19. Thus, the second monocoded digital-signal is transduced to the second decoded pulse at fourth coded IDT 19. As a result, an output digital-signal, which is composed of the first- and second decoded pulses and is equivalent to the message digital-signal, is detected at detecting terminal 21 via detecting device 20 without the influence of noises.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A transmitting and receiving system for digital communication on electric power-lines comprising:
    a transmitting device consisting of
        an input terminal,
        a bipolar-pulse generator,
        a first piezoelectric substrate,
        a first coded IDT consisting of at least three interdigital electrode pairs, and having a first coded pattern,
        a second coded IDT consisting of at least three interdigital electrode pairs, and having a second coded pattern,
        a first intermediary IDT,
        an electrode group consisting of two sideward IDTs and a central IDT between said sideward IDTs,
        a synchronizing device connected between said first intermediary IDT and one of said sideward IDTs,
        an envelope detecting device connected with said central IDT,
        a monopolar-pulse generator, and
        a mixer connected with electric power-lines; and
    a receiving device consisting of
        a receiving connector connected with said electric power-lines,
        a tuning coil,
        a second piezoelectric substrate,
        a second intermediary IDT,
        a third coded IDT having a third coded pattern in reverse to said first coded pattern,
        a fourth coded IDT having a fourth coded pattern in reverse to said second coded pattern,
        a detecting device, and
        a detecting terminal,
            said bipolar-pulse generator receiving monopolar pulses of a message digital-signal via said input terminal, and transducing said monopolar pulses to bipolar pulses (−1 and 1),
            said first- and second coded IDTs exciting first- and second SAWs, respectively, on said first piezoelectric substrate when receiving said bipolar pulses (−1 and 1), respectively,
            said first intermediary IDT detecting a coded burst-signal corresponding to said first- and second coded patterns, respectively,
            said synchronizing device generating a synchronizing pulse-signal,
            said one of said sideward IDTs receiving said coded burst-signal and said synchronizing pulse-signal, and exciting a third SAW on said first piezoelectric substrate,
            the other of said sideward IDTs receiving said coded burst-signal at the same time that said one of said sideward IDTs receives said coded burst-signal, and exciting a fourth SAW on said first piezoelectric substrate,
            said central IDT receiving said third- and fourth SAWs simultaneously,
            said monopolar-pulse generator causing a coded digital-signal via said envelope detecting device, and then, delivering said coded digital-signal into said electric power-lines via said mixer,
            said receiving connector receiving said coded digital-signal from said electric power-lines,
            said second intermediary IDT exciting a fifth SAW on said second piezoelectric substrate, when receiving said coded digital signal via said tuning coil,
            said third- and fourth coded IDTs detecting two decoded pulses, respectively, if said fifth SAW corresponds to said third- and fourth coded patterns, respectively,
            said detecting device delivering an output digital-signal, which is based on said two decoded pulses and is equivalent to said message digital-signal, via said detecting terminal.

2. A transmitting and receiving system for digital communication on electric power-lines as defined in claim 1, wherein said first-, second-, third-, and fourth coded patterns are changed in accordance with a designated time region, respectively.

3. A transmitting and receiving system for digital communication on electric power-lines as defined in claim 1, wherein the propagation direction of said first- and second SAWs is orthogonal to that of said third- and fourth SAWs.

4. A transmitting and receiving system for digital communication on electric power-lines as defined in claim 1, wherein said first- and second piezoelectric substrates are made of a piezoelectric ceramic plate, respectively, the polarization axis thereof being parallel to the thickness direction thereof.

5. A transmitting and receiving system for digital communication on electric power-lines as defined in claim 1 further comprising a subdevice, which is located between said tuning coil and said second intermediary IDT and consists of a third piezoelectric substrate, an input IDT, an output IDT located in parallel with said input IDT, an envelope detecting device, and a bipolar-pulse generator,
    said input IDT receiving said coded digital-signal via said tuning coil, and exciting a SAW on said third piezoelectric substrate,
    said output IDT detecting a coded row of bursts,
    said envelope detecting device of said subdevice causing a coded row of digital-pulses,
    said bipolar-pulse generator of said subdevice generating a coded row of high-frequency bipolar-pulses, and
    said second intermediary IDT receiving said coded row of high-frequency bipolar-pulses.

6. A transmitting and receiving system for digital communication on electric power-lines as defined in claim 1 further comprising a bipolar-pulse generator in place of said monopolar-pulse generator.

7. A transmitting and receiving system for digital communication on electric power-lines comprising:

a transmitting device consisting of
- an input terminal,
- a first bipolar-pulse generator,
- a first piezoelectric substrate,
- a first coded IDT consisting of at least three interdigital electrode pairs Pi (i=1, 2, . . . , n), of which two neighbors are at a distance L from each other, and having a first coded pattern,
- a second coded IDT consisting of at least three interdigital electrode pairs Pi (i=1, 2, . . . , n), of which two neighbors are at a distance L from each other, and having a second coded pattern,
- a first electrode-group consisting of an interdigital electrode $A_0$ and an interdigital electrode $A_i$ (i=1) at a distance iL (i=1) from said interdigital electrode $A_0$,
- an envelope detecting device connected with said first electrode-group,
- a monopolar-pulse generator, and
- a mixer connected with electric power-lines; and a receiving device consisting of
- a receiving connector connected with said electric power-lines,
- a tuning coil,
- a second piezoelectric substrate,
- a second electrode-group consisting of a central interdigital electrode $B_0$, a left interdigital electrode $B_{-1}$ at a distance $L_0$ from said central interdigital electrode $B_0$, and an interdigital electrode $B_i$ (i=1) at a distance $L_0+iL$ (i=1) from said central interdigital electrode $B_0$,
- a second bipolar-pulse generator,
- an intermediary IDT,
- a third coded IDT having a third coded pattern in reverse to said first coded pattern,
- a fourth coded IDT having a fourth coded pattern in reverse to said second coded pattern,
- a detecting device, and
- a detecting terminal, said bipolar-pulse generator receiving monopolar pulses of a message digital-signal via said input terminal, and transducing said monopolar pulses to bipolar pulses (−1 and 1), said first- and second coded IDTs exciting first- and second SAWs, respectively, on said first piezoelectric substrate when receiving said bipolar pulses (−1 and 1), respectively, said interdigital electrode $A_0$ detecting a coded burst-signal corresponding to said first- and second coded patterns, respectively, said interdigital electrode $A_i$ detecting said coded burst-signal after a time corresponding to said distance iL, said monopolar-pulse generator causing a double-coded digital-signal from said coded burst-signal at said interdigital electrode $A_0$ and that at said interdigital electrode $A_i$, via said envelope detecting device, and delivering said double-coded digital-signal into said electric power-lines via said mixer, said receiving connector receiving said double-coded digital-signal from said electric power-lines, said left interdigital electrode $B_{-1}$ and said right interdigital electrode $B_i$ exciting third- and fourth SAWs, respectively, on said second piezoelectric substrate when receiving said double-coded digital-signal, said second bipolar-pulse generator causing a mono-coded digital-signal from said third- and fourth SAWs via said central interdigital electrode $B_0$, said intermediary IDT exciting a fifth SAW on said second piezoelectric substrate when receiving said monocoded digital-signal, said third- and fourth coded IDTs detecting two decoded pulses, respectively, if said fifth SAW corresponds to said third- and fourth coded patterns, respectively, said detecting device delivering an output digital-signal, which is based on said two decoded pulses and is equivalent to said message digital-signal, via said detecting terminal.

8. A transmitting and receiving system for digital communication on electric power-lines as defined in claim 7, wherein said first-, second-, third-, and fourth coded patterns are changed in accordance with a designated time region, respectively.

9. A transmitting and receiving system for digital communication on electric power-lines as defined in claim 7, wherein the propagation direction of said third- and fourth SAWs is orthogonal to that of said fifth SAW.

10. A transmitting and receiving system for digital communication on electric power-lines as defined in claim 7, wherein said first- and second piezoelectric substrates are made of a piezoelectric ceramic plate, respectively, the polarization axis thereof being parallel to the thickness direction thereof.

11. A transmitting and receiving system for digital communication on electric power-lines as defined in claim 7 further comprising a third bipolar-pulse generator in place of said monopolar-pulse generator.

12. A transmitting and receiving system for digital communication on electric power-lines as defined in claim 7, wherein said first electrode-group includes at least two interdigital electrodes $A_i$ {i=1, 2, . . . , (n−1)} at a distance iL {i=1, 2, . . . , (n−1)}, respectively, from said interdigital electrode $A_0$, said second electrode-group includes at least two right interdigital electrodes $B_i$ {i=1, 2, . . . , (n−1)} at a distance $L_0+iL$ {i=1, 2, . . . , (n−1)}, respectively, from said central interdigital electrode $B_0$, said at least two interdigital electrodes $A_i$ take turns in connecting with said envelope detecting device, and at the same time, said at least two right interdigital electrodes $B_i$ take turns in connecting with said receiving connector.

* * * * *